United States Patent
Kakino

(10) Patent No.: US 10,401,261 B2
(45) Date of Patent: Sep. 3, 2019

(54) ACTUATOR MONITORING SYSTEM

(75) Inventor: Atsushi Kakino, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 204 days.

(21) Appl. No.: 13/980,899

(22) PCT Filed: Mar. 21, 2012

(86) PCT No.: PCT/JP2012/057237
§ 371 (c)(1),
(2), (4) Date: Jul. 22, 2013

(87) PCT Pub. No.: WO2012/133066
PCT Pub. Date: Oct. 4, 2012

(65) Prior Publication Data
US 2013/0335242 A1  Dec. 19, 2013

(30) Foreign Application Priority Data
Mar. 30, 2011  (JP) .................................. 2011-075987

(51) Int. Cl.
*G01M 99/00* (2011.01)
*B64D 45/00* (2006.01)
*G05B 23/02* (2006.01)
*B64F 5/60* (2017.01)

(52) U.S. Cl.
CPC ............. *G01M 99/00* (2013.01); *B64D 45/00* (2013.01); *B64F 5/60* (2017.01); *G05B 23/0283* (2013.01); *B64D 2045/0085* (2013.01)

(58) Field of Classification Search
None
See application file for complete search history.

(56) References Cited

U.S. PATENT DOCUMENTS

| 7,301,296 B1* | 11/2007 | Discenzo | 318/400.04 |
| 2003/0079934 A1* | 5/2003 | Kanda | B62D 5/0481 180/446 |
| 2006/0036402 A1* | 2/2006 | Deller | B64F 5/0045 702/183 |

(Continued)

FOREIGN PATENT DOCUMENTS

| JP | 62-159204 | 7/1987 |
| JP | 62-144187 | 9/1987 |

(Continued)

OTHER PUBLICATIONS

Reconsideration Report dated Jun. 2, 2015 in Japanese Application No. 2011-075987 (with partial English translation).

(Continued)

*Primary Examiner* — James J Yang
*Assistant Examiner* — Kevin Lau
(74) *Attorney, Agent, or Firm* — Wenderoth, Lind & Ponack, L.L.P.

(57) ABSTRACT

An actuator monitoring system is provided with an electric actuator having a motor and a control unit which outputs a control command (CMD) to the motor to control the operation of the motor. The control unit calculates a use time of the electric actuator based on the control command (CMD) outputted to the motor. Moreover, the control unit estimates the lifetime of the electric actuator based on the calculated use time.

3 Claims, 2 Drawing Sheets

(56) References Cited

U.S. PATENT DOCUMENTS

2008/0203224 A1\* 8/2008 Yount .................... B64C 13/42
244/99.5
2010/0262320 A1 10/2010 Koizumi et al.

FOREIGN PATENT DOCUMENTS

| | | | |
|---|---|---|---|
| JP | 2-84093 | | 3/1990 |
| JP | 9-131085 | | 5/1997 |
| JP | 09131085 A | \* | 5/1997 |
| JP | 2000-159195 | | 6/2000 |
| JP | 2001-219867 | | 8/2001 |
| JP | 2001219867 A | \* | 8/2001 |
| JP | 2010-247602 | | 11/2010 |

OTHER PUBLICATIONS

Office Action dated Feb. 9, 2016 in Japanese Application No. 2011-75987, with partial English translation.
International Preliminary Report on Patentability and Written Opinion of the International Searching Authority dated Oct. 8, 2013 in International (PCT) Application No. PCT/JP2012/057237.
International Search Report dated Jun. 19, 2012 issued in International (PCT) Application No. PCT/JP2012/057237.
Decision on Appeal issued Jan. 4, 2017 in Japanese Patent Application No. 2011-75987, with partial translation.

\* cited by examiner

1: ACTUATOR MONITORING SYSTEM

ACTUATOR MONITORING SYSTEM

TECHNICAL FIELD

The present invention is relates to an actuator monitoring system which monitors an actuator installed in an aircraft.

BACKGROUND ART

Actuators are installed in an aircraft to drive an airfoil, a taking-off and landing unit and so on. The actuator is repaired or replaced when it fails or reaches repair timing. The repair timing is typically determined by a serviceman based on a past repair record.

However, strictly, operation records differ from each other for every aircraft. Therefore, there is a possibility that the actuator fails prior to previously set repair timing. Also, there is a case that the actuator can be used sufficiently even if the previously set repair timing has passed away. Therefore, the technique which can estimate the lifetime of the actuator in a high precision is demanded.

Patent Literature 1 discloses a technique that can know the exchange timing of the actuator even if the aircraft is in a flight condition. Specifically, a position sensor attached to the actuator detects a position of a piston of the actuator and outputs a position signal to a control unit. The control unit calculates a movement amount of the piston of the actuator based on a position signal. When a total movement amount of the piston of the actuator exceeds a preset threshold value, the control unit outputs a notice signal. The notice signal is outputted even if the aircraft is in the flight condition.

CITATION LIST

[Patent literature 1]: JP 2010-247602A

SUMMARY OF THE INVENTION

One object of the present invention is to provide a technique which can estimate a lifetime of an actuator installed in an aircraft in a high precision.

In one aspect of the present invention, an actuator monitoring system is provided with an electric actuator having a motor, and a control unit which outputs a control command to the motor to control the operation of the motor. The control unit calculates a use time of the electric actuator based on the control command outputted to the motor. Moreover, the control unit estimates a lifetime of the electric actuator based on the calculated use time.

The motor may feed back a feedback signal (FB) showing a value of electric current which flows through itself, to the control unit. In this case, the control unit calculates a torque of the motor based on the feedback signal (FB). Then, the control unit estimates the lifetime of the electric actuator based on the calculated use time and the calculated torque.

When the actuator reaches the estimated lifetime earlier than the previously set repair timing, the control unit may output a warning through a warning unit.

According to the present invention, the lifetime of the actuator installed in the aircraft can be estimated in a high precision.

DESCRIPTION OF EMBODIMENTS

Hereinafter, embodiments of the present invention will be described with reference to the attached drawings

First Embodiment

Figure 1:
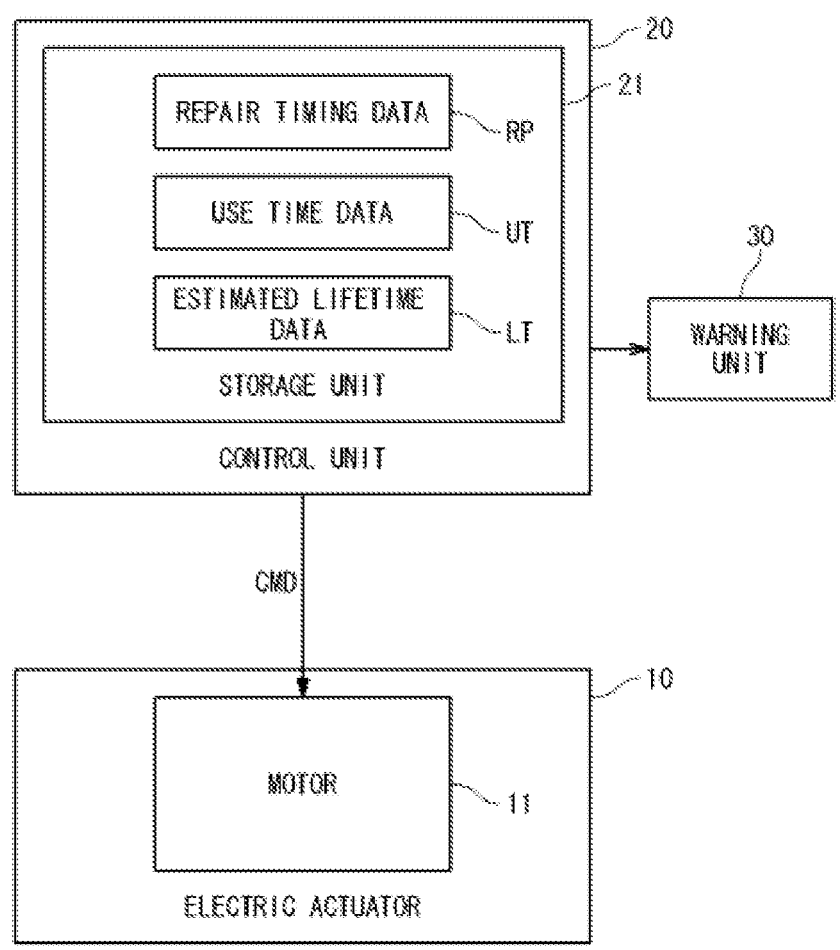
FIG. 1 is a block diagram showing a configuration of an actuator monitoring system according to a first embodiment of the present invention.

FIG. 1 is a block diagram showing a configuration of an actuator monitoring system 1 according to a first embodiment of the present invention. The actuator monitoring system 1 is installed in an aircraft. The actuator monitoring system 1 is composed of an electric actuator 10, a control unit 20 and a warning unit 30.

The electric actuator 10 drives a control surface and a taking-off and landing unit of the aircraft. The electric actuator 10 is composed of an electric motor 11.

The control unit 20 may be typically a flight control computer (FCC) which is installed in the aircraft. The control unit 20 controls the operations of other units installed in the aircraft. Especially, in the present embodiment, the control unit 20 outputs a control command CMD to the motor 11 to control the operation of the motor 11. For example, the control command CMD is used to instruct ON/OFF of the motor 11 and instruct the number of rotations of the motor 11 and so on.

Also, the control unit 20 is composed of a storage unit 21. RAM (Random Access Memory) and HDD (Hard Disk Drive) are exemplified as the storage unit 21. Repair timing data RP, use time data UT, and estimated lifetime data LT are stored in the storage unit 21. The repair timing data RP shows previously set timing of the repair of the electric actuator 10. The use time data UT shows a use time of the electric actuator 10 calculated by the control unit 20 to be mentioned later. The estimated lifetime data LT shows a lifetime of the electric actuator 10 which is estimated by the control unit 20 to be mentioned later.

A display and lights are exemplified as the warning unit 30.

The operation of the actuator monitoring system 1 according to the present embodiment will be described as follows.

First, the repair timing of the electric actuator 10 is previously set based on past repair records. The repair timing data RP showing the repair timing is stored in the storage unit 21 of the control unit 20.

In the operation of the aircraft, the control unit 20 outputs the control command CMD to the motor 11 to control the operation of the motor 11 of the electric actuator 10. For example, the control command CMD is outputted to instruct ON/OFF of the motor 11 and instruct the number of rotations of the motor 11 and so on.

The control unit 20 calculates the use time of the electric actuator 10 based on the control command CMD outputted to the motor 11. The use time data UT showing the calculated use time is stored in the storage unit 21 of the control unit 20. Because the use time of the electric actuator 10 can be known, the lifetime of the electric actuator 10 can be estimated by referring to a database showing the past results. That is, the control unit 20 estimates an actual lifetime of the electric actuator 10 based on the above calculated use time. The estimated lifetime data LT showing the estimated lifetime is stored in the storage unit 21 of the control unit 20.

It should be noted that the use time data UT and the estimated lifetime data LT are updated at any time by the control unit 20.

Also, the control unit 20 compares the estimated lifetime shown by the estimated lifetime data LT with the repair timing shown by the repair timing data RP. When the estimated lifetime ends earlier than the repair timing, the control unit 20 drives the warning unit 30. The warning unit 30 output a warning to a pilot. For example, when the warning unit 30 is a display, the warning is displayed on the display. When the warning unit 30 is a light, the light is lighted up. Also, when the electric actuator 10 does not reach the estimated lifetime but reaches the repair timing, the control unit 20 may drive the warning unit 30.

As described above, according to the present embodiment, the lifetime of the electric actuator 10 can be estimated in a high precision based on the control command CMD outputted to the motor 11. Thus, it becomes possible to prevent a failure of the electric actuator 10 prior to the previously set repair timing. As a result, the reliability of the control system of the aircraft can be improved.

Second Embodiment

Figure 2:
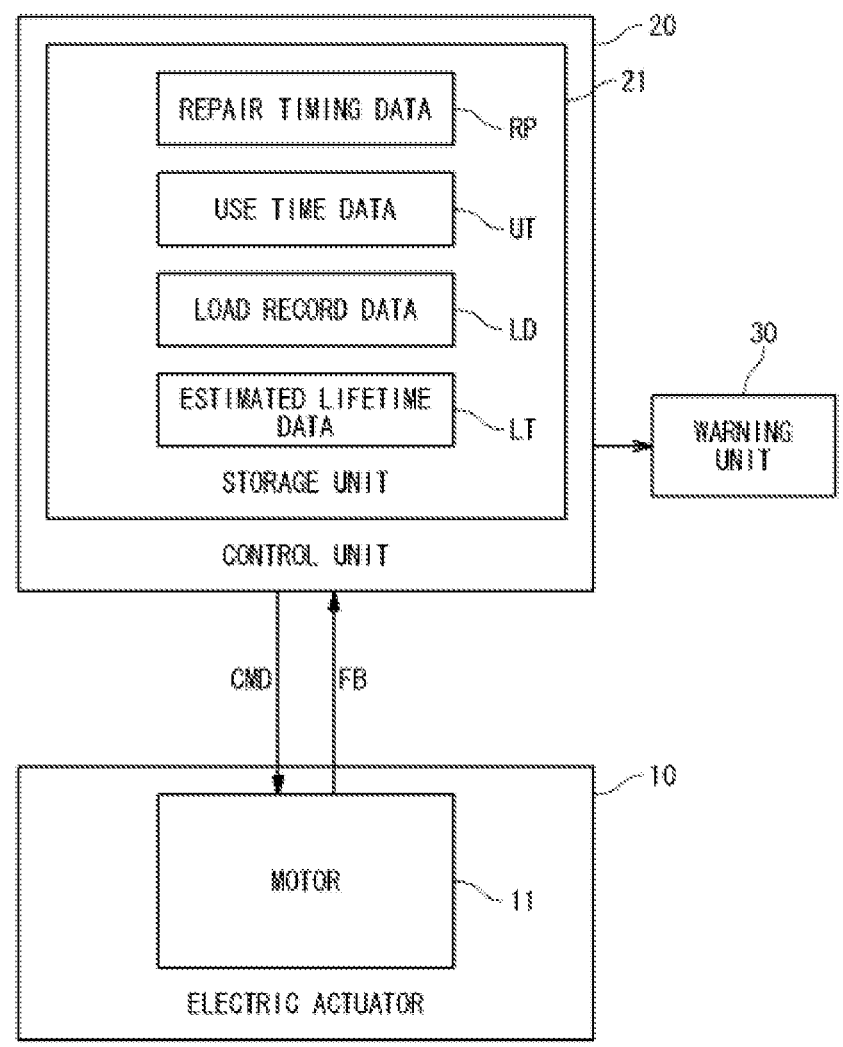
FIG. 2 is a block diagram showing a configuration of the actuator monitoring system according to a second embodiment of the present invention.

FIG. 2 is a block diagram showing a configuration of the actuator monitoring system 1 according to a second embodiment of the present invention. The description which overlaps the first embodiment will be appropriately omitted.

In the second embodiment, the motor 11 feeds back the feedback signal FB showing the value of electric current which flows through itself, to the control unit 20. The control unit 20 calculates the torque of the motor 11 based on the feedback signal FB received from the motor 11. Thus, the control unit 20 can estimate a load imposed on the electric actuator 10. Load record data LD showing a record of the estimated load is stored in the storage unit 21 of the control unit 20. It should be noted that the load record data LD is updated at any time by the control unit 20.

The control unit 20 estimates an actual lifetime of the electric actuator 10 in the consideration of the record of the estimated load shown by the load record data LD, in addition to the use time shown by the use time data UT. Therefore, the precision of the estimation of the lifetime of the electric actuator 10 can be further improved than the first embodiment.

Third Embodiment

The control unit 20 is not limited only to a flight control computer (FCC). For example, the control unit 20 may contain an actuator control computer (ACC). The FCC outputs a position command to the ACC, and the ACC outputs the control command CMD of the electric current command and so on to the motor 11 of the electric actuator 10. In this case, the ACC may estimate the actual lifetime of the electric actuator 10 based on the control command CMD outputted to the motor 11 and the feedback signal FB received from the motor 11. In this case, the ACC outputs the warning signal to the FCC, and the FCC drives the warning unit 30 in response to the warning signal. By such a configuration, the same effect as in the above embodiments can be attained.

The embodiments of the present invention have been described with reference to the attached drawings. However, the present invention is not limited to the above-mentioned embodiments and can be appropriately modified without deviating from the spirit of the present invention.

The present application claims a priority on convention based on Japanese Patent Application JP 2011-075987 filed on Mar. 30, 2011. The disclosure thereof is incorporated herein by reference.

The invention claimed is:

1. An actuator monitoring system comprising:
    a plurality of electric actuators respectively provided for a plurality of movable sections of an aircraft, each of the electric actuators including a motor which drives a corresponding one of the moveable sections; and
    a control unit including a storage unit, the control unit controlling the electric actuators, the control unit outputting, to each of the motors, a control command to control an operation of each of the motors to control an ON/OFF state of the motor and instruct a number of rotations of the motor, and the control unit being provided as a separate body from the electric actuators,
    wherein the control unit (i) calculates and stores in the storage unit, a total use time of each of the electric actuators from an output time of the control command to a corresponding one of the motors, (ii) generates a position command to one of the movable sections, and generates a current command as the control command to the corresponding one of the motors based on the position command, (iii) calculates and stores in the storage unit, a torque of the corresponding one of the motors from the current command based on a feedback signal from the corresponding one of the motors to the control unit, the feedback signal indicating a value of an electric current that flows through the corresponding one of the motors, (iv) estimates a lifetime of each of the electric actuators based on both of the total use time of the electrical actuator stored in the storage unit and the torque of the corresponding one of the motors stored in the storage unit by comparing the total use time of the electrical actuator and the torque of the corresponding one of the motors stored in a database, and (v) repeatedly updates the total use time, load record data corresponding to the torque, and the estimated lifetime, and
    wherein the control unit compares the estimated lifetime of each of the electric actuators with a repair timing indicated by repair time data stored in the storage unit, and when the estimated lifetime of an electric actuator from among the electric actuators ends earlier than the repair timing, the control unit drives a warning unit to output a warning.

2. An aircraft comprising:
    a plurality of movable sections; and
    an actuator monitoring system, which includes:
        a plurality of electric actuators respectively provided for a plurality of movable sections of the aircraft, each of the electric actuators including a motor which drives a corresponding one of the moveable sections; and
        a control unit including a storage unit, the control unit controlling the electric actuators, the control unit outputting, to each of the motors, a control command to control an operation of each of the motors to control an ON/OFF state of the motor and instruct a number of rotations of the motor, and the control unit being provided as a separate body from the electric actuators,
    wherein the control unit (i) calculates and stores in the storage unit, a total use time of each of the electric actuators from an output time of the control command to a corresponding one of the motors, (ii) generates a position command to one of the movable sections, and generates a current command as the control command to the corresponding one of the motors based on the position command, (iii) calculates and stores in the storage unit, a torque of the corresponding one of the motors from the current command based on a feedback signal from the corresponding one of the motors to the control unit, the feedback signal indicating a value of an electric current that flows through the corresponding one of the motors, (iv) estimates a lifetime of each of the electric actuators based on both the total use time of the electrical actuator stored in the storage unit and the torque of the corresponding one of the motors stored in the storage unit by comparing the total use time of the electrical actuator and the torque of the corresponding one of the motors stored in a database, and (v) repeatedly updates the total use time, load record data corresponding to the torque, and the estimated lifetime, and wherein the control unit compares the estimated lifetime of each of the electric actuators with a repair timing indicated by repair time data stored in the storage unit, and when the estimated lifetime of an electric actuator from among the electric actuators ends earlier than the repair timing, the control unit drives a warning unit to output a warning.

3. An actuator monitoring system comprising:

an electric actuator provided for a movable section of an aircraft, the electric actuator including a motor which drives the movable section; and a control unit including a storage unit, the control unit controlling the electric actuator by outputting a control command to the motor to control an ON/OFF state of the motor and instruct a number of rotations of the motor, wherein the control unit is provided as a separate body from the electric actuator, wherein the control unit calculates and stores, in the storage unit, a total use time of the electric actuator based on an output time of the control command to the motor, wherein the control unit generates a position command to the movable section, and generates a current command, as the control command, to the motor from the position command, wherein the control unit calculates and stores, in the storage unit, load record data corresponding to a torque of the motor from the current command based on a feedback signal from motor to the control unit, the feedback signal indicating a value of an electric current that flows through the motor, wherein the control unit estimates a lifetime of electrical actuator based on both of the total use time of the electrical actuator stored in the storage unit and the load record data stored in the storage unit by comparing the total use time of the electrical actuator and the load record data to values stored in a database, wherein the control unit repeatedly updates the estimated lifetime of the electrical actuator by repeatedly calculating the total use time of the electrical actuator and the load record data, and wherein the control unit compares the estimated lifetime of the electric actuator with a repair timing indicated by repair time data stored in the storage unit, and when the estimated lifetime of the electric actuator ends earlier than the repair timing, the control unit drives a warning unit to output a warning.

* * * * *